(12) United States Patent
Anttila

(10) Patent No.: US 11,618,120 B2
(45) Date of Patent: Apr. 4, 2023

(54) CONTROL SYSTEM FOR CONTROLLING A TOOL OF A MACHINE

(71) Applicant: Novatron Oy, Pirkkala (FI)

(72) Inventor: Arto Anttila, Tampere (FI)

(73) Assignee: Novatron Oy, Pirkkala (FI)

( * ) Notice: Subject to any disclaimer, the term of this patent is extended or adjusted under 35 U.S.C. 154(b) by 954 days.

(21) Appl. No.: 16/449,530

(22) Filed: Jun. 24, 2019

(65) Prior Publication Data

US 2020/0016715 A1 Jan. 16, 2020

(30) Foreign Application Priority Data

Jul. 12, 2018 (FI) ..................................... 20180080

(51) Int. Cl.

| | |
|---|---|
| *B23Q 17/22* | (2006.01) |
| *B23Q 3/16* | (2006.01) |
| *B23Q 17/00* | (2006.01) |
| *E02F 9/12* | (2006.01) |
| *E02F 9/22* | (2006.01) |
| *E02F 9/26* | (2006.01) |

(52) U.S. Cl.
CPC .......... *B23Q 17/2208* (2013.01); *B23Q 3/16* (2013.01); *B23Q 17/002* (2013.01); *E02F 9/123* (2013.01); *E02F 9/2285* (2013.01); *E02F 9/264* (2013.01)

(58) Field of Classification Search
CPC .... B23Q 17/002; B23Q 17/2208; B23Q 3/16; E02F 9/123
See application file for complete search history.

(56) References Cited

U.S. PATENT DOCUMENTS

| | | | | |
|---|---|---|---|---|
| 9,618,941 | B2 * | 4/2017 | Palmroth | ................ E02F 3/436 |
| 2004/0158355 | A1 | 8/2004 | Holmqvist et al. | |
| 2006/0271263 | A1 | 11/2006 | Self et al. | |
| 2010/0223008 | A1 | 9/2010 | Dunbabin et al. | |
| 2012/0263566 | A1 | 10/2012 | Taylor et al. | |
| 2012/0323451 | A1 * | 12/2012 | Shatters | ................ F15B 21/087 |
| | | | | 701/50 |
| 2013/0255977 | A1 | 10/2013 | Braunstein et al. | |
| 2013/0261885 | A1 * | 10/2013 | Hargrave, Jr. | ........ E02F 9/2033 |
| | | | | 345/633 |

(Continued)

FOREIGN PATENT DOCUMENTS

| | | |
|---|---|---|
| CA | 1 177 959 A | 11/1984 |
| EP | 1 883 871 A2 | 2/2008 |

(Continued)

OTHER PUBLICATIONS

Notification of the First Office Action received for Chinese Patent Application Serial No. 201910606550.0 dated Mar. 28, 2022, 17 pages. (Including English Translation).

(Continued)

*Primary Examiner* — Abiy Teka
(74) *Attorney, Agent, or Firm* — FisherBroyles, LLP

(57) ABSTRACT

A control system for controlling a tool of a machine includes at least one controller and detecting means. The detecting means includes at least one range finder device for at least partly detecting and positioning an object with regards to the tool in 3D space. An operation mode of the at least one controller depends at least in part on the object. A machine and a method for controlling a tool of the machine are also disclosed.

19 Claims, 3 Drawing Sheets

(56) References Cited

U.S. PATENT DOCUMENTS

2017/0121941 A1    5/2017  Chioccola

FOREIGN PATENT DOCUMENTS

| EP | 2 543 482 A1 | 1/2013 |
|---|---|---|
| EP | 2 631 374 A1 | 8/2013 |
| EP | 2 987 399 A1 | 2/2016 |
| KR | 10-2017-0086968 A | 7/2017 |
| WO | 2006/130497 A2 | 12/2006 |
| WO | 2006/130497 A3 | 12/2006 |
| WO | 2008/047872 A1 | 4/2008 |

OTHER PUBLICATIONS

Extended European Search Report received for EP Patent Application Serial No. 19182611.4 dated Dec. 16, 2019, 9 pages.
Office Action from the Finnish Patent and Registration Office for Patent Application No. 20180080, dated Dec. 20, 2018, 7 pages.
Search Report from the Finnish Patent and Registration Office for Patent Application No. 20180080, dated Nov. 13, 2018, 2 pages.

\* cited by examiner

CONTROL SYSTEM FOR CONTROLLING A TOOL OF A MACHINE

CROSS-REFERENCE TO RELATED APPLICATION

This application claims the benefit of Finland Patent Application No. 20180080, filed on Jul. 12, 2018, the disclosure of which is incorporated herein by reference in its entirety.

BACKGROUND

Field

The invention relates to a control system for controlling a tool of a machine, a machine, a method for controlling a tool of a machine, a computer program product and a computer program embodied on a non-transitory computer readable storage medium for controlling the machine.

Description of the Related Art

Different types of machines may be utilized at different work sites for example for moving soil or rock material to another location or to process them into a desired shape. Examples of that type of machines are earthmoving machines used in excavation work and road construction, for example. This type of machines have user interfaces containing a number of controllers and a number of displaying means for an operator to interact with the earthmoving machine.

SUMMARY

An object of the present invention is to provide a novel type control system for controlling a tool of a machine. A further object is to provide a novel type machine equipped with the control system.

The invention is characterized by the features of the independent claims. Some embodiments of the invention are disclosed in the dependent claims.

The invention is based on the idea of detecting and positioning an object to be handled by a tool of a machine in 3D space so that not only the position of the tool in respect of the machine is recognized but also the position of the object in respect of the tool and/or the machine is known when the object is either carried by the tool of the machine or free from the tool of the machine. The invention comprises a control system for controlling the tool of the machine, the control system comprising at least one controller. The control system further comprises detecting means, the detecting means comprising at least one range finder device for at least partly detecting and positioning an object with regards to the tool in 3D space and wherein an operation mode of the at least one controller depends at least in part on the object. The control of the tool comprises at least operating of the tool as such as well as moving the tool with parts of the machine to extensions reachable by the tool when the machine is in place, possibly including also rotation of the machine or part thereof when the machine is in place and/or possibly including also moving the machine with regards to the object or requesting the operator to move the machine with regards to the object.

The object to be handled by the tool of the machine is thus an object of interest, the term "object of interest" referring to such object that may be, for example, intended to be handled, being handled, to be handled, handled, carried, gripped, to be gripped, to be selected, to be approached and already hauled by the tool of the machine. Thus, the object of interest may not be any surrounding obstacle that should be avoided to be hit, for example. Therefore, this object of interest is an object which may be approached by the machine and/or the tool whereas an obstacle is an object to be avoided by the machine and/or the tool.

An advantage of the control system of the invention is that the position of the object with regards to the tool and/or the machine is recognized and any possible collision of the object to the tool and/or the machine may be avoided by a selection of a proper operation mode depending at least in part of the object.

A machine comprises a movable carrier, at least one tool, actuating means for moving the tool in relation to the carrier and a control system comprising at least one controller, the control system further comprising a detecting means for at least partly detecting and positioning an object with regards to the tool in 3D space, and that the operation mode of the at least one controller depends at least in part on the object.

A method for controlling a tool of a machine using at least one controller, the method comprising determining an operation mode of the at least one controller and detecting and positioning an object with regards to the tool in 3D space.

According to an embodiment of the control system, the control system further comprises sensing means for providing a control unit with position and/or orientation data of the tool and/or the machine with regards to a work site 3D space, and wherein the operation mode of the at least one controller depends at least in part on the position and/or orientation of the tool and/or the machine and/or the object.

According to an embodiment of the control system, the sensing means further provides the control system with position data of surrounding obstacles and that the operation mode of the at least one controller depends at least in part on the surrounding obstacles.

According to an embodiment of the control system, the detecting means further comprises a receiving unit for receiving as an input at least one of dimension data of the object, weight of the object, a safety zone data of the object and a destination location for the object, and wherein the operation mode of the at least one controller depends at least in part on the sensed surroundings and/or at least one of dimension data of the object, weight of the object, the safety zone data and the destination location for the object.

According to an embodiment of the control system, the safety zone data comprises safety zone data for at least one of the object, the tool and the machine.

According to an embodiment of the control system, the control system further comprises a transceiving unit, the transceiving unit being configured to receive the work site 3D space regarding at least a work site 3D model and virtual safety zones regarding the work site and all the updates for at least the work site 3D model and the virtual safety zones, to transmit updates to the work site 3D space regarding at least the work site 3D model and virtual safety zones of the tool and/or the machine and/or the objects.

According to an embodiment of the control system, the detecting means further comprises suggesting at least one safety zone around at least one of the object, the tool and the machine and a displaying means for displaying the suggested at least one safety zone.

According to an embodiment of the control system, the receiving unit further comprises receiving instructions regarding a gripping point the object to be gripped at, and the detecting means further comprises instructing means for instructing a control unit and/or an operator to move the tool to take a grip at the object at the instructed gripping point and/or to move the object gripped to the destination location inputted.

According to an embodiment of the control system, the instructions received by the receiving unit are at least one of marking on the object detected by the range finder device and displayed by the displaying means, gripping point pointed by the operator using a pointing device and displayed by the displaying means, gripping point inputted with respect to the dimension data of the object and destination location of the object in work site 3D space.

According to an embodiment of the control system, the at least one controller is operable both attached and detached, i.e. both attached to the machine and detached from the machine.

According to an embodiment of the control system, the control system comprises at least two controllers for controlling all the operations of at least the tool and the driving of the machine.

According to an embodiment of the control system, the surrounding obstacle is at least one of ground, building, other machine, other object, human, animal, virtual static boundary or virtual moving boundary.

According to an embodiment of the control system, the control system further comprises means for determining the location of the at least one controller with respect to the tool and/or the machine and/or the object carried by the tool.

According to an embodiment of the control system, the data regarding the object displayed by the displaying means comprises further at least an illustration of the at least one dimension data.

According to an embodiment of the control system, the detecting means further comprises detecting at least one further dimension of the object and the one further dimension being added to the dimension data gathered regarding the dimensions of the object.

According to an embodiment of the control system, the sensing means further comprises sensing a risk of tipping of the machine, wherein the safety zone data is to be updated with temporal virtual safety zone area in the direction of the risk of tipping of the machine, and the operation mode of the at least one controller depends at least in part on the risk of tipping of the machine and/or at least one of audiovisual, visual illumination, haptics and force-feedback alarm regarding the risk sensed by the detecting means.

According to an embodiment of the control system, the operation mode of the at least one controller depends on the user specified adjustments made by or made for the user currently logged in to the control system.

According to an embodiment of the control system, the extent of the available adjustments depends on the skill level data of the operator currently logged in, the skill level data being defined by at least one of usage hours of the machine, usage hours of the corresponding machine, competence level accomplished or passed by an examination or test.

According to an embodiment of the control system, the operator with administrator privileges define the skill level by editing the skill level data regarding the operator.

According to an embodiment of the control system, the operator with administrator privileges define the skill level by editing the skill level data regarding the operator in a cloud service and the machine retrieves the data from the cloud service.

According to an embodiment of the control system, the operation of the machine controllable by the at least one controller is at least one of: driving system, peripheral device, maintenance system, road navigation system, work site navigation system, positioning the tool with respect to the work site, weighing system, automation system, measuring system and process control.

According to an embodiment of the control system, the control system gives feedback by at least one of the following signals: graphical, augmented reality, virtual reality, audiovisual, visual illumination, haptics and force-feedback.

According to an embodiment of the machine, the machine is one of the following: excavator, crane, bulldozer, motor grader, compaction machine, piling machine, deep stabilization machine, surface top drilling machine.

A computer program product comprises executable code that when executed, cause execution of functions according to any one of claims 1 to 23.

A computer program embodied on a non-transitory computer readable storage medium is configured to control a processor to execute functions according to any one of claims from 1 to 23.

BRIEF DESCRIPTION OF THE DRAWINGS

In the following the invention will be described in greater detail by means of embodiments with reference to the accompanying drawings, in which.

For the sake of clarity, the figures show some embodiments of the disclosed solution in a simplified manner. In the figures, like reference numerals identify like elements.

DETAILED DESCRIPTION

Figure 1:
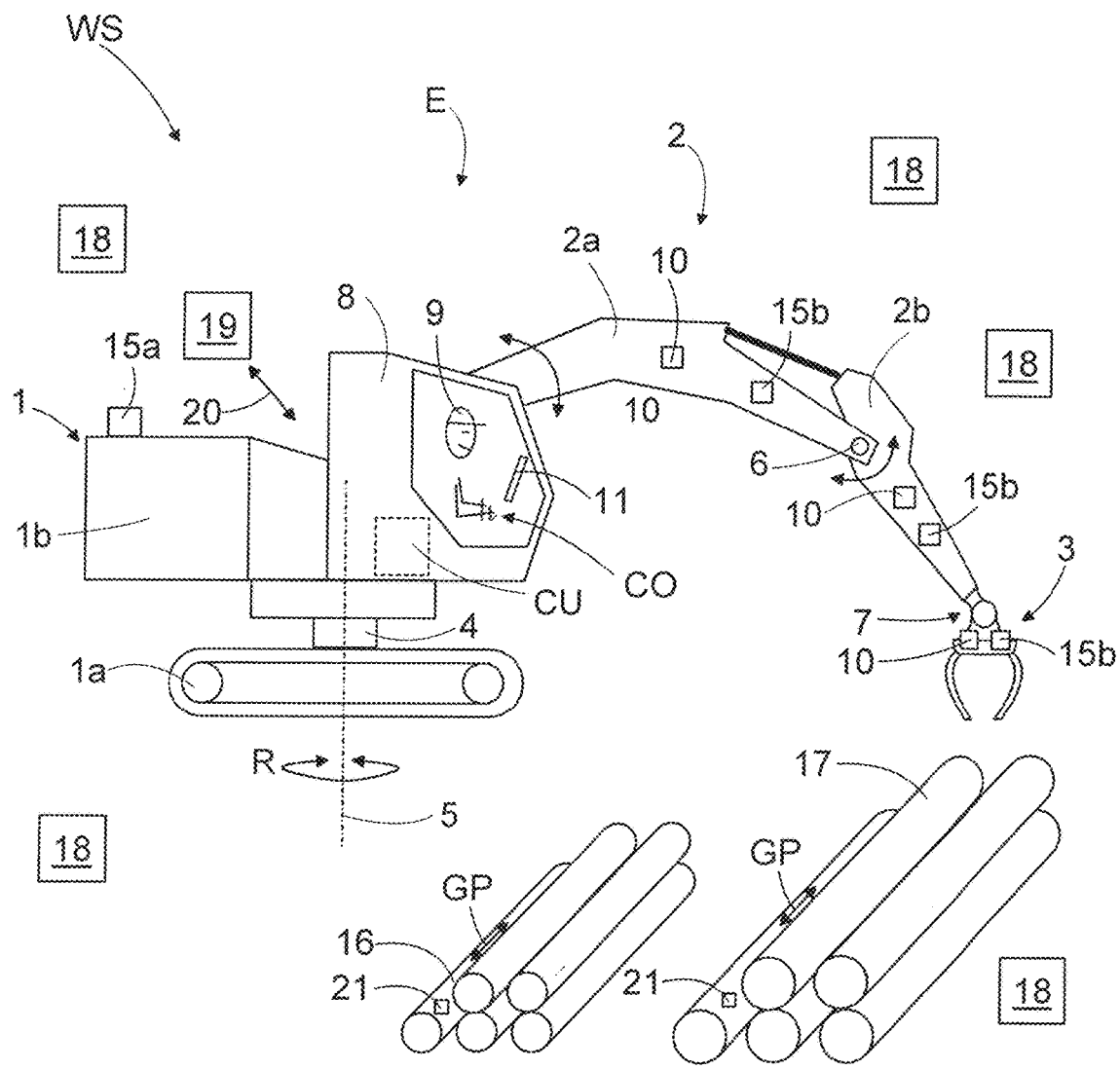
FIG. 1 is a schematic side view of a machine.

FIG. 1 shows a machine E located at a work site WS. The machine E is in this case a movable excavator-type machine comprising a movable carrier 1 on which a boom 2 is arranged, but wherein a bucket normally being at a distal end of the boom 2 is replaced with a gripper so that the machine E is capable to grip and move a number of different sizes of piles 16 and 17, for example, the piles 16 and 17 forming kinds of objects to be handled by the machine E. The gripper thus forms a tool 3 of the machine E.

The carrier 1 may comprise an under carrier 1*a* and an upper carrier 1*b*. The upper carrier 1*b* may be connected to the under carrier 1*a* by means of a rotating axle 4. The upper carrier 1*b* may be rotated R around a rotating axis 5 of the rotating axle 4. The boom 2 is arranged to turn together with the upper carrier 1*b*. The boom 2 may comprise a first boom part 2*a* and a second boom part 2*b*. The first boom part 2*a* may be connected to the carriage 1 by means of first joint, which is not shown. The second boom part 2*b* may be connected to the first boom part 2*a* by means of a second joint 6. At a distal end of the second boom part 2*b* is the aforementioned working tool 3, in this case the gripper which is connected to the second boom part 2*b* by a third joint 7 which allows the gripper to turn and tilt relative to the second boom part 2*b*. Between the third joint 7 and the working tool 3 there may also be a wrist actuator or element allowing to rotate the tool 3 to a position suitable for gripping the object, if this rotation is not allowed by the third joint 7.

On the carrier 1 is a control cabin 8 for an operator 9. The control cabin 8 may be provided with a moving arrangement allowing vertical position of the control cabin 8 to be adjusted relative to the carrier 1.

The machine E is provided with one or more control units CU and one or more range finder devices 10. At least one range finder device 10 may be arranged to the boom 2, whereby the range finder device 10 is moved together with the boom 2. The boom 2 may be provided with at least two range finder devices 10 arranged to different locations on the boom 2 and thereby having different angles of view. It is also possible to arrange one range finder device 10 to the first boom part 2a and another range finder device 10 to the second boom part 2b. It is also possible to arrange at least one range finder device 10 to the tool 3, the control cabin 8 and/or the carrier 1 or any other suitable place in the machine E. According to an embodiment the range finder device 10 is a LiDAR instrument. The LiDAR is a laser radar device which uses ultraviolet, visible or near infrared light from lasers. According to an embodiment the range finder device 10 is a radar instrument based on use of radio waves. According to an embodiment the range finder device 10 is a sound based ultrasonic instrument. According to an embodiment the range finder device 10 is a time-of-flight camera, stereo camera or other image sensor. The range finder device 10 may also be or comprise a vision camera or any other means capable of creating a 3D vision wherefrom an object may be detected by analysing the 3D vision by a control unit CU forming a part of the control system of the machine E or a part of a range finder arrangement including the at least one range finder device 10.

The at least one range finder device 10 provides at least part of detecting means DM for at least partly detecting and positioning the object with regards to the tool 3 in 3D space of the work site WS, and therefore also for detecting and positioning the object with regards to the machine in 3D space of the work site WS. The 3D space of the work site WS, or in other words, the work site 3D space refers to a three-dimensional volume including the work site WS, i.e. to a three-dimensional volume wherefrom the work site WS forms a part of. The at least one control unit CU provides control actions for operating the machine E and the tool 3 in response to controls provided by the operator 9 and/or various measurements and observations provided by instruments connected to a control system of the machine E and/or the tool 3.

The machine E is also provided with a number of controllers CO, for example one to four controllers CO, configurable to control operations of the machine E and/or the tool 3 therein. According to an embodiment there are at least two controllers CO configurable to control all the operations of at least the tool 3 and a driving of the machine E. According to an embodiment the amount of controllers CO is two whereby one of the controller CO may be used by hands and the other one by feet, for example. The controllers CO are typically attached to the machine E but at least one controller CO may also be detachable from the machine E. The at least one range finder device 10 may in that case provide some means to determine the location of the at least one controller with respect to the tool 3 and/or machine E and/or the object carried by the tool 3.

The operation of the machine E controllable by the at least one controller CO is at least one of: driving system, peripheral device, maintenance system, road navigation system, work site navigation system, positioning the tool 3 with respect to the work site, weighing system, automation system, measuring system and process control.

The machine E may also be provided with a number of display units 11, i.e. at least one display unit 11, providing a type of displaying means through which the operator 5 may monitor at least an operation of the tool 3, for example. The display unit 11 may for example be a transparent display unit 11.

Figure 2:
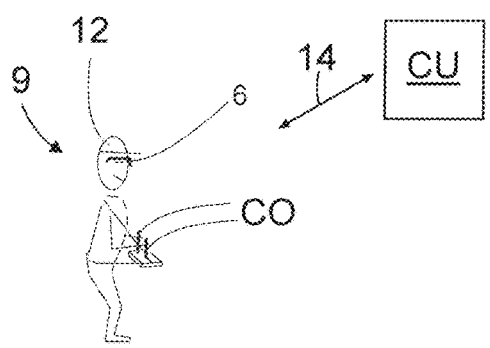
FIG. 2 is a schematic view of an operator operating a machine outside a control cabin of the machine.
Figure 3:
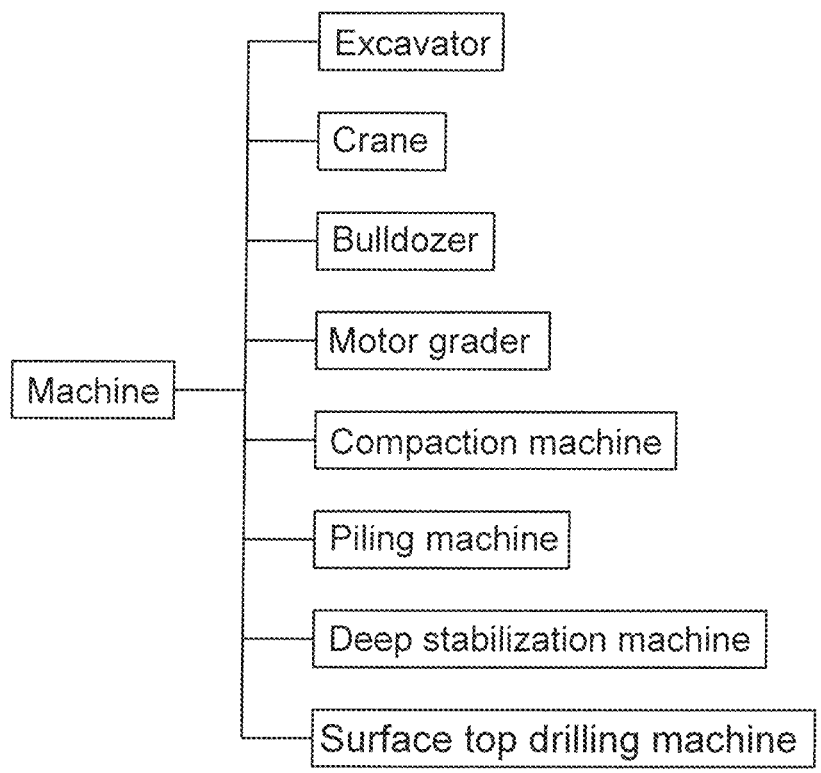
FIG. 3 is a schematic diagram showing some feasible machines.

As said above, according to an embodiment at least one controller CO may be detachable from the machine E, whereby the machine E and/or the tool 3 therein may be controlled from outside of the control cabin 8. FIG. 2 discloses schematically the operator 5 controlling the machine E from outside the control cabin 8. The operator 9 has a vest where the at least one controller CO is attached and a headset 12 provided with at least one head-mounted display unit 13. The head-mounted display unit 13 may for example be a transparent display unit, such as media glasses. The at least one controller CO and the head-set 12 are configurable to be set in operational connection with at least one control unit CU of the machine E through at least one data communication channel 14 so that the operator 9 may control operations of the machine E and/or the tool 3 therein even at operating situations wherein the machine E is out of sight of the operator 9.

The machine E may also be provided with a number of sensing means 15a, 15b, i.e. at least one sensing means 15a, 15b arranged at the carrier 1 and/or the boom 2 and/or the tool 3 for providing the at least one control unit CU with position and/or orientation data of the machine E and/or the tool 3 with regards to a work site WS 3D space, i.e. in a. three-dimensional model of the work site WS depicting for example machines, structures and articles locating at the work site WS. The sensing means 15b arranged at the boom 2 and/or the tool 3 or a functionality thereof may also be included in the range finder devices 10 arranged at the boom 2 and/or the tool 3. According to an embodiment the sensing means 15a, 15b a LiDAR instrument. The LiDAR is a laser radar device which uses ultraviolet, visible or near infrared light from lasers. According to an embodiment the sensing means 15a, 15b is a radar instrument based on use of radio waves. According to an embodiment the sensing means 15a, 15b is a sound based ultrasonic instrument. According to an embodiment the sensing means 15a, 15b is a time-of-flight camera, stereo camera or other image sensor. The sensing means 15a, 15b may also be or comprise a vision camera or any other means capable of detecting obstacles and measuring distances, position and/or orientation of these obstacles. The sensing means may also include at least one navigation system, such as global navigation satellite system, for determining position and direction of the machine E.

The data provided by the at least one range finder device 10 and the at least one sensing means 15a, 15b is transmitted to the control unit 9. The control unit 9 processes the data and provides control information utilized in the control system for controlling the machine E and/or the tool 3 therein.

The machine E disclosed in FIG. 1 is one type of machine wherein the control system CS disclosed herein may be utilized. Generally the machine E in which the control system CS disclosed herein may be utilized may for example be one of the following: excavator, crane, bulldozer, motor grader, compaction machine, piling machine, deep stabilization machine, surface top drilling machine, the list disclosed herein, however, not being exclusive.

Figure 4:
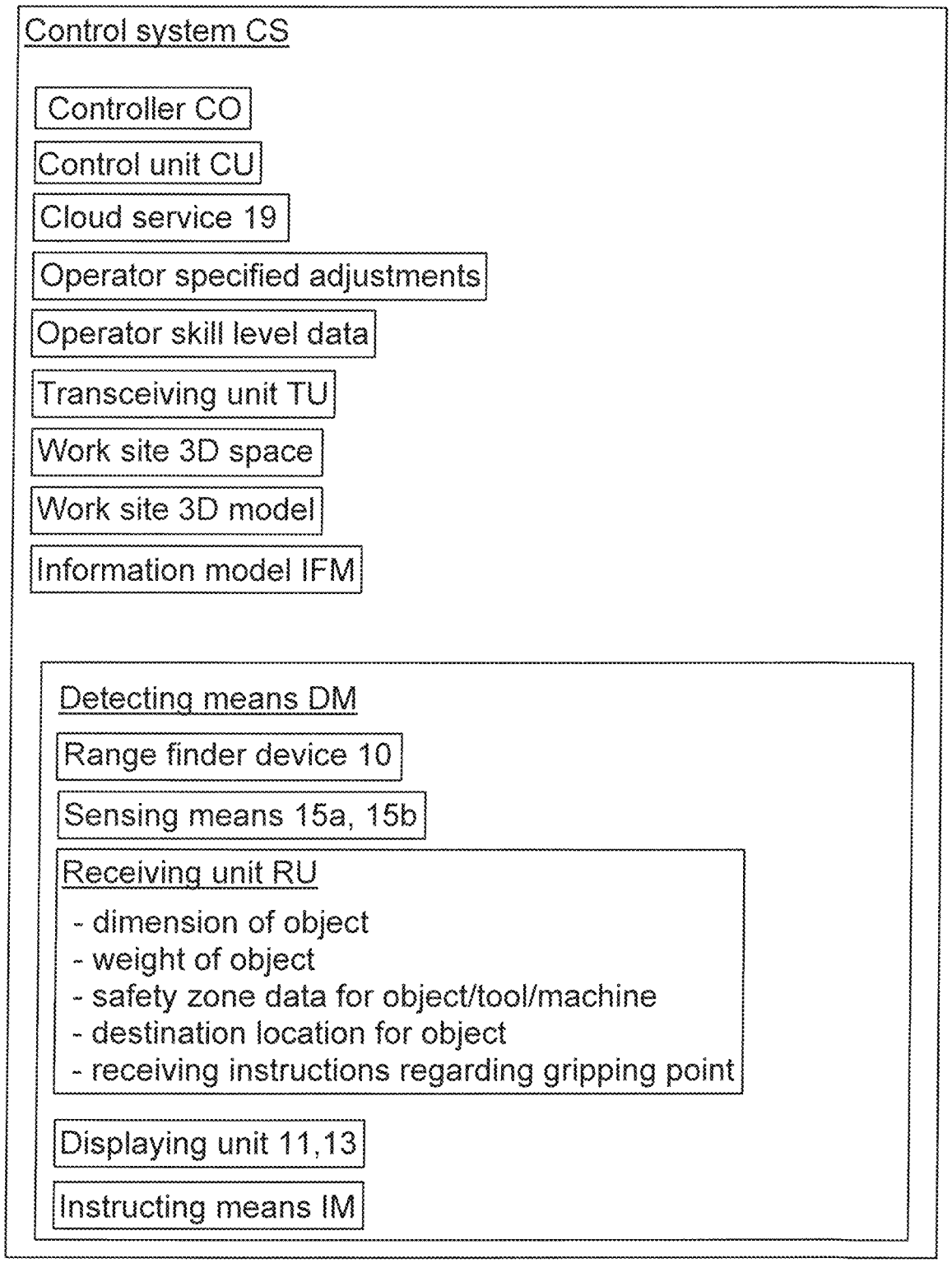
FIG. 4 is a schematic diagram showing a control system for controlling a tool of a machine.

FIG. 4 is a schematic diagram showing a control system CS for controlling a tool of a machine. The control system CS is intended to control movements of the tool so that the tool and a possible object intended to be handled by the tool and being suspended by the tool does not provide any element of danger for an operator of the machine or surroundings of the machine, the one or more objects handled or intended to be handled by the machine E providing a load of machine E. When considering the example of FIG. 1, the tool is the gripper and the at least one object to be handled by the tool is at least one of the piles 16, 17.

The control system CS for controlling the tool 3 of the machine E comprises at least one controller CO. The control system CS further comprises detecting means DM, the detecting means DM comprising at least one range finder device 10 for at least partly detecting and positioning the object with regards to the tool 3 in 3D space of the work site WS, when the object is either suspended by the tool 3 or at a position at the work site WS. Furthermore, in the control system CS an operation mode of the at least one controller CO depends at least in part on the object, such as on at least one dimension or weight of the object. The detecting means may alternatively or additionally comprise a stereo camera arrangement.

The operation mode of the at least one controller CO defines at least one movement of the tool 3 of the machine E. For example, if there are no obstacles in the surroundings of the machine E, the movements of the tool 3 may be faster and/or large-scale, but if there is at least one surrounding obstacle in the surroundings of the machine E, the movements of the tool 3 may be slower and/or minor so as to avoid any risk of being hit to the obstacle by the tool 3 or the object being handled by the tool 3. Possible changes in the operation mode may vary for example depending on the operating situation of the machine E, for example depending on whether the object is to be approached or whether the object is already hauled.

The surrounding obstacle may for example be ground, such as a formation of the ground at the work site WS, for example a hillock at the work site WS. The surrounding obstacle may also be for example a building at the work site or other machine or other object at the work site WS. The surrounding obstacle may also be for example an animal got into the work site WS or a human working at the work site WS, including also the operator 9 of the machine E controlling the operations of the machine E outside of the control cabin 8 of the machine E with the controller CO detached from the machine E. The surrounding obstacle may also be a virtual static boundary set for a static obstacle at the work site WS or a virtual moving boundary set for an obstacle being able to move. The setting of the virtual static or moving boundary may have been initiated by the operator 9 of the machine E to be controlled and remaining at the work site WS or by the operator of the machine or the machine itself or the human entering into the work site WS. FIG. 1 discloses very schematically some surrounding obstacles 18 at the work site WS.

When the operation mode of the at least one controller depends at least in part on the object, the operation mode may depend for example on the dimensions of the object, such as length, width, height, thickness, diameter or circumference of the object. If the object fits into the tool 3 completely, the tool 3 is easier to handle, for example to stop, when compared to situations wherein the object extends far away from the tool 3 and provides different kind of lever efforts affecting the tool 3 and the machine E. Herein the length, width, height, thickness, diameter or circumference of the object may refer to the dimensions detected by the detecting means DM or to the dimensions set to the object for example by the operator 9.

Alternatively, or in addition to, the operation mode of the at least one controller CO may depend on the weight of the object, herein, again, a heavy object causing more significant forces of inertia in the handling of the tool 3 and the machine E.

Alternatively, or in addition to, the operation mode of the at least one controller CO may depend on the prevailing or current speed and direction of motion of the object being suspended by the tool 3. The object moving too fast may initiate a need to change the operation mode to a one providing a slower movement of the object. The operation mode causing the object to move very slowly may, in turn, be changed to a one providing a faster movement of the object if that is allowable in view of the surrounding obstacles. The operation mode of the at least one controller CO may also depend on a target value set for the speed of the movement of the object.

According to an embodiment, the operation mode of the at least one controller CO may depend, in addition to the at least one feature disclosed above, on a speed and direction of the movement of a moving surrounding obstacle 18, whereby the operation mode of the at least one controller CO may for example be changed in response to the moving surrounding obstacle 18 possibly entering into an area of extension of the at least one of the machine E, the tool 3 and the object handled or to be handled by the tool 3.

According to an embodiment, the operation mode of the at least one controller CO may depend, in addition to the at least one feature disclosed above, on a speed and direction of the movement of the virtual moving boundary set for the obstacle being able to move.

According to an embodiment, the operation mode of the at least one controller CO may depend, in addition to the at least one feature disclosed above, on a property of an underlay, such as a softness of the underlay at which the machine E is operating. The softness of the underlay may be detected for example on the basis of an inclination of the machine observed by respective inclination sensors or corresponding means.

According to an embodiment, the operation mode of the at least one controller CO may depend, in addition to the at least one feature disclosed above, on the operator 9 specified adjustments made by or made for the operator 9 currently logged in to the control system CS.

According to an embodiment, the operation mode of the at least one controller CO and extent of available adjustments therein may depend, in addition to the at least one feature disclosed above, on the skill level data of the operator 9 currently logged in the control system CS of the machine E. The skill level data may be defined by at least one of usage hours of the machine E, usage hours of the corresponding machine E, competence level accomplished or passed by an examination or test. The operator 9 with administrator privileges may define the skill level by editing the skill level data regarding the operator 9. The operator 9 with administrator privileges may define the skill level by editing the skill level data regarding the operator 9 in a cloud service 19 and the machine E retrieves the data from the cloud service 19 through a respective cloud service communication channel 20.

According to an embodiment of the control system CS, the control system CS further comprises sensing means 15a, 15b for providing the control unit CU with position and/or orientation data of the tool 3 and/or the machine E with regards to a work site 3D space, and wherein the operation mode of the at least one controller CO depends at least in part on the position and/or orientation of the tool 3 and/or the machine E and/or the object, such as the piles 16, 17. This means that possible control actions to be executed in operating the machine E and/or the tool 3 may be dependent on the location and/or orientation of the tool 3 and/or the machine and/or the object to be handled by the tool 3.

According to an embodiment of the control system CS, the sensing means 15a, 15b further provides the control system CS with position data of the surrounding obstacles 18, and that the operation mode of the at least one controller CO depends at least in part on the surrounding obstacles 18, whereby the operation mode of the at least one controller CO may for example be changed in response to the surrounding obstacle 18 possibly remaining in an area of extension of the at least one of the machine E, the tool 3 and the object handled or to be handled by the tool 3.

According to an embodiment of the control system CS, the detecting means DM further comprises a receiving unit RU for receiving as an input at least one of dimension data of the object, weight of the object, a safety zone data and a destination location for the object, and wherein the operation mode of the at least one controller CO depends at least in part on the sensed surroundings and/or at least one of dimension data of the object, weight of the object, the safety zone data and the destination location for the object. The data regarding the object may be displayed by at least one displaying unit and it may be configured to display at least one illustration of the at least one dimension data of the object.

When the operation mode of the at least one controller CO depends at least in part on the sensed surroundings, the control system CS prevents any collision between a surrounding obstacle 18 and the machine E, the tool 3 and the object being handled by the tool 3. The dimension data of the object and the weight of the object may be information that is input to the control system CS for the first time when the object is intended to be handled by the tool 3 of the machine E. Alternatively the dimension data of the object and the weight of the object may be information input to the control system CS when the object is delivered to the work site WS. The dimension and weight data may also be edited or supplemented when the object is intended to be handled by the tool 3 of the machine E. The detecting means DM may also detect at least one further dimension of the object and this one further dimension may be added into the dimension data regarding the dimensions of the object.

The safety zone data may determine a portion in the object which must not be gripped for some reason when handling the object, for example due to vulnerable accessories installed to the object. Additionally or alternatively the safety zone data may comprise data determining safety zones around the machine E and/or the tool 3. The safety zone data for the machine E and/or the tool 3 may be either fixedly stated or editable.

The destination location for the object may for example determine the intended final or temporary position where the object is intended to be placed to, the control system CS either operating automatically the machine E and the tool 3 for hauling the object or only assisting the operator 9, if necessary.

The receiving unit RU may for example comprise a keyboard and/or a pointer for proving means to input the information disclosed above.

According to an embodiment of the control system, the control system CS further comprises a transceiving unit TU which is configured to receive the work site 3D space regarding at least a work site 3D model and virtual safety zones regarding the work site and all the updates for at least the work site 3D model and the virtual safety zones and to transmit updates to the work site 3D space regarding at least the work site 3D model and virtual safety zones of the tool 3 and/or the machine E and/or the objects at the work site WS. As stated above, the work site 3D space refers to a three-dimensional volume including the work site WS, i.e. to a three-dimensional volume wherefrom the work site WS forms a part of, and the work site 3D model refers to the 3D model of the actual worksite. The 3D model may be updated all the time during the progress of the work site WS.

According to an embodiment of the control system CS, the detecting means DM further comprises suggesting at least one safety zone around at least one of the object, the tool 3 and the machine E and a displaying means, such as displaying units 11, 13 for displaying the suggested at least one safety zone. The safety zones around at least one of the object, the tool 3 and the machine E may be different at different times, such as when the object is approached or when the object is already hauled.

According to an embodiment of the control system CS, the receiving unit RU further comprises receiving instructions regarding a gripping point GP the object to be gripped at, and that the detecting means DM further comprises instructing means IM for instructing a control unit CU and/or an operator 9 to move the tool 3 to take a grip at the object at the instructed gripping point GP and/or to move the object gripped to the destination location inputted. The gripping point GP provides a specific point where the object may be gripped to in view of endurance of the object and/or optimal behaviour of the object when it is hauled with the machine E. The instructing means IM may include for example a selected automatically operating operation mode or an operating mode informing the operator 9 to control the machine E and/or the tool 3 in a specific way. The instructing means IM may comprise directional lines or arrows guiding the direction where to move the tool to take a grip at. Additionally the tool in it's current position may be displayed with the guiding directional lines or arrows. Alternatively or additionally the instructing means may comprise chain of commands that may be run for example by a single button or switch or the like that may be interrupted if desired, for example, by stopping the pressing of the button.

The instructions received by the receiving unit RU may for example be at least one of: marking on the object detected by the range finder device 10 and displayed by the displaying means 11, 13; gripping point GP pointed by the operator 9 using a pointing device and displayed by the displaying means; gripping point GB inputted with respect to the dimension data of the object, disclosed for example with specific units of measurement or proportional to the selected dimension data of the object; and destination location of the object in the work site 3D space.

According to an embodiment of the control system CS, the sensing means 15a, 15b further comprises sensing a risk of tipping of the machine E, wherein the safety zone data is to be updated with temporal virtual safety zone area in the direction of the risk of tipping of the machine E, and the operation mode of the at least one controller CO depends at least in part on the risk of tipping of the machine and/or at least one of audiovisual, visual illumination, haptics and force-feedback alarm regarding the risk sensed by the detecting means DM. A solution for proving feedback by the control system by at least one of the following signals: graphical, augmented reality, virtual reality, audiovisual, visual illumination, haptics and force-feedback may not be utilized only in sensing the risk of the tipping of the machine but possibly also in response to any control actions executed.

Detecting means DM may also be configured to detect an object to be selected from a group of objects. According to an embodiment the group of object may comprise a selection of different type of objects with regards for example to size or intended purpose of use of the objects. According to another embodiment the group of objects may comprise a number of similar objects with similar characteristics without any significant differences between individual objects. According to a further embodiment the group of objects may comprise similar kinds of objects but at least some of them being specifically individualized for example on the basis of specific accessories installed or to be installed to the object or on the basis of the intended location where the object is intended to be finally located at the work site WS.

This object detection and selection may be based for example on shape and/or size recognition of the objects or in view of specific object identifiers 21 attached to the objects and the corresponding object data input to an information model IFM possibly forming part of the work site 3D model. The object identifiers 21 may be based on RDIF, barcode or near-field-communication (NFC) technology, or any other technology carrying out the same purpose than the previously mentioned or any combination of these technologies. The information model IMF may also comprise information about a storage place of the objects at the work site WS and a placement where the objects are intended to be finally located to for their actual purpose of use at the work site WS. The control system CS may be configured to determine, on the basis of the data in the information model IMF, the object to be needed next and either to control the machine E or to assist the operator 9 to collect the object from the storage place and to haul and possibly install it to the position where the object is intended to be used at the finished work site WS.

According to an embodiment of the control system CS, the control system thus comprises an information model IMF comprising information of at least one of shape, size and at least one individual object identifier of at least one object and at least one of a storage place of the object and an installation position and/or orientation of the object at the work site WS.

It will be obvious to a person skilled in the art that, as the technology advances, the inventive concept can be implemented in various ways. The invention and its embodiments are not limited to the examples described above but may vary within the scope of the claims.

What is claimed is:

1. A control system that controls a tool of a machine, the control system comprising:
   at least one controller, wherein the control system further comprises:
   at least one range finder device operable to at least partly detecting and position an object of interest with regards to the tool in 3D space; and
   a receiving unit operable to receive instructions regarding a gripping point of the object of interest to be gripped at,
   the control system further operable to instruct at least one of: a control unit and an operator to at least one of: move the tool to take a grip at the object of interest at the instructed gripping point and move the object of interest gripped to a destination location inputted, wherein if the control system instructs to move the object of interest to the destination location inputted, the receiving unit is further operable to receive at least the destination location for the object of interest,
   an operation mode of the at least one controller depending at least in part on the object of interest.

2. The control system as claimed in claim 1, wherein the control system is further operable to
   provide a control unit with at least one of position and orientation data of at least one of the tool and the machine with regards to a work site 3D space, and
   wherein the operation mode of the at least one controller depends at least in part on at least one of the position and orientation of at least one of the tool, the machine, and the object of interest.

3. The control system as claimed in claim 2, wherein the control system is further operable to
   provide position data of surrounding obstacles, and
   the operation mode of the at least one controller depends at least in part on the surrounding obstacles.

4. The control system as claimed in claim 2, wherein the control system further comprises:
   a transceiving unit, the transceiving unit being configured to perform operations comprising:
   receiving the work site 3D space regarding at least a work site 3D model and virtual safety zones regarding the work site and all the updates for at least the work site 3D model and the virtual safety zones; and
   transmitting updates to the work site 3D space regarding at least the work site 3D model and virtual safety zones of at least one of the tool, the machine, and the objects of interest.

5. The control system as claimed in claim 2, wherein the control system suggests at least one safety zone around at least one of the object of interest, the tool, and the machine, and the control system comprises at least one display unit for displaying the suggested at least one safety zone.

6. The control system as claimed in claim 1,
   wherein the receiving unit is further operable to receive as an input at least one of dimension data of the object of interest, weight of the object of interest, and a safety zone data, and
   wherein the operation mode of the at least one controller depends at least in part on at least one of the sensed surroundings, dimension data of the object of interest, weight of the object of interest, the safety zone data, and the destination location for the object of interest.

7. The control system as claimed in claim 6, wherein the safety zone data comprises safety zone data for at least one of the object, the tool, and the machine.

8. The control system as claimed in claim 6, wherein the instructions received by the receiving unit comprise at least one of:
   marking on the object detected by the range finder device and displayed by at least one display unit;
   gripping point pointed by the operator using a pointing device and displayed by the at least one display unit;
   gripping point (GB) inputted with respect to the dimension data of the object; and
   destination location of the object in work site 3D space.

9. The control system as claimed in claim 6, wherein the control system is operable to sense a risk of tipping of the machine,
   wherein the safety zone data is to be updated with temporal virtual safety zone area in the direction of the risk of tipping of the machine, and
   wherein the operation mode of the at least one controller depends at least in part on at least one of the risk of tipping of the machine and at least one of audiovisual, visual illumination, haptics, and force-feedback alarm regarding the risk sensed by the control system.

10. The control system as claimed in claim 1, wherein the at least one controller is operable both attached to the machine and detached from the machine.

11. The control system as claimed in claim 10, wherein the control system is further operable to determine the location of the at least one controller with respect to at least one of the tool, the machine, and the object carried by the tool.

12. The control system as claimed in claim 1, wherein the control system comprises at least two controllers for controlling all the operations of at least the tool and the driving of the machine.

13. The control system as claimed in claim 1, wherein the operation mode of the at least one controller depends on the operator specified adjustments at least one of made by and made for the operator currently logged in to the control system and that the extent of the available adjustments depends on the skill level data of the operator currently logged in, the skill level data being defined by at least one of usage hours of the machine, usage hours of the corresponding machine, and competence level at least one of accomplished and passed by at least one of an examination and test.

14. The control system as claimed in claim 1, wherein the operation of the machine controllable by the at least one controller is at least one of driving system, peripheral device, maintenance system, road navigation system, work site navigation system, positioning the tool with respect to the work site, weighing system, automation system, measuring system, and process control.

15. The control system as claimed in claim 1, wherein the control system gives feedback by at least one of a graphical signal, augmented reality signal, virtual reality signal, audiovisual signal, visual illumination signal, haptics signal, and force-feedback signal.

16. The control system as claimed in claim 1, further comprising a second controller.

17. A machine comprising:
a movable carrier;
at least one tool operable to move in relation to the carrier;
a control system comprising at least one controller, wherein the control system is further
operable to at least partly detect and position an object of interest with regards to the tool in 3D space,
operable to receive instructions regarding a gripping point of the object of interest to be gripped at, and
operable to instruct at least one of: a control unit and an operator to at least one of: move the tool to take a grip at the object of interest at the instructed gripping point and move the object of interest gripped to a destination location inputted, wherein if the control system instructs to move the object of interest to the destination location inputted, the receiving unit is further operable to receive at least the destination location for the object of interest; and
an operation mode of the at least one controller depending at least in part on the object of interest.

18. The machine as claimed in claim 17, wherein the machine comprises at least one of an excavator, crane, bulldozer, motor grader, compaction machine, piling machine, deep stabilization machine, surface top drilling machine.

19. A method for controlling a tool of a machine using at least one controller, the method comprising:
at least partly detecting and positioning an object of interest with regards to the tool in 3D space;
determining an operation mode of the at least one controller, wherein the operation mode of the at least one controller is determined by
receiving instructions regarding a gripping point of the object of interest to be gripped at, and
instructing at least one of: a control unit and an operator to at least one of: move the tool to take a grip at the object of interest at the instructed gripping point and move the object of interest gripped to a destination location inputted, wherein if the control system instructs to move the object of interest to the destination location inputted, the receiving unit is further operable to receive at least the destination location for the object of interest.

* * * * *